United States Patent Office 3,244,533
Patented Apr. 5, 1966

3,244,533
AROMATIZING INSTANT COFFEE
William P. Clinton, Munsey, N.Y., Theodore Kraut, Englewood, N.J., and Esra Pitchon, Flushing, N.Y., assignors to General Foods Corporation, White Plains, N.Y., a corporation of Delaware
No Drawing. Filed Sept. 23, 1965, Ser. No. 489,737
9 Claims. (Cl. 99—71)

This application is a continuation-in-part of Serial No. 303,944 filed August 22, 1963 now abandoned and Serial No. 152,911 filed November 16, 1961 (now abandoned).

This invention relates to a process for improving the flavor and taste of instant coffee.

In the past, instant coffee has been aromatized either by plating (coating) the aromatic material on the dried coffee powder or by adding the aromatic material to the liquid coffee extract prior to drying. This aromatic material has usually been coffee oil, volatile aromas, or a combination of both aroma sources.

Coffee oil can be obtained either by solvent extraction of roasted beans or by expressing (squeezing the oil from the roasted beans by pressure). However, this aroma source while it contains a broad spectrum of aromatic compounds cannot be added at a high level due to the oil presenting a mouthfeel problem in the reconstituted product.

Volatile aromas are obtained by collecting the vapors from roasted coffee and condensing the volatile aromatics in these vapors. The volatiles may be collected at room temperature, at elevated temperatures or with steam under either atmospheric or vacuum conditions. This aroma source is characterized by a high concentration of low-boiling aromatic compounds, typically, those having a boiling point below that of water.

Due to their different flavor effects and the fixative value of the oil for volatile aromas, the tendency has been to combine the two aroma sources with the soluble coffee in an attempt to attain a more aromatic brew. However, both "plating" of the aroma sources or their addition to the liquid extract prior to drying has caused problems.

"Plating" of the two aroma sources on the dried product presents a serious stability problem, off-flavors being developed in several hours in some cases. Other disadvantages include poor flowability (caking and clumping of the dried powder), non-uniform distribution of the aromatic material, and loss of the fixative oil properties as the volatile aroma level is increased.

Addition of the aromatic material to the liquid extract prior to the drying operation presents dispersion problems in distributing the oil and aromas in the liquid extract, the oil tending to separate from the extract stream due to the natural physical density differences of the oil and extract and the immiscibility of the oil in the extract. The oil which separates out from the extract, being a good absorber of volatiles, carries a good portion of the volatile aromas thus decreasing the aroma impact. This separation problem causes related problems of non-uniformity in the final dried coffee whether it be spray-dried or freeze-dried, some of the dried coffee containing no oil and volatile aroma while other coffee contains too much oil and aromas. This again, causes stability and flowability problems similar to the "plated" product.

It is thus seen that several distinct problems have yet to be solved in the manufacture of an aromatized instant coffee.

This invention is based on the discovery that a superior soluble coffee of the aromatic variety can be produced by removing coffee oil and volatile aromas from freshly roasted coffee, extracting the coffee to obtain a dearomatized extract of coffee solids, dispersing the coffee oil in said extract at a homogenization pressure of above 1000 p.s.i.g. to thereby avoid separation of the oil, mixing the volatile aromas with said homogenized extract while avoiding degradation of this aroma source, and then drying the aromatized extract to obtain an instant coffee of improved flavor and taste.

It is necessary to use pressures of above 1000 p.s.i.g. in order to achieve a good emulsion of coffee oil in the extract. At lower pressures the oil tends to separate from the extract at some time prior to the drying operation. Moreover, it has been found that degradation of the volatile aromas occurs by homogenizing both the coffee oil and the volatile aromatics together thus reducing the possible flavor advantages to an insignificant level. This is due to the high temperatures developed during the high pressure homogenization. Chilling of the extract during homogenization causes congealing of the oil thus preventing effective dispersion of the oil in the extract. For this reason, separate treatment of the different aroma sources is essential to obtaining an instant coffee of improved taste and flavor.

The level of homogenized coffee oil employed in the soluble coffee of this invention will be between 0.2% to 2%, preferably 0.5% to 1%, by weight of the soluble solids in the final coffee product. At levels above 2% an excessive cloudiness is observed in the rehydrated product. Preferably, the oil is homogenized at 1000 to 3000 p.s.i.g. in a small portion of the extract stream, the homogenized oil-extract is added back to the main extract stream and the volatile aromas are then dispersed into the extract. However, the oil can be homogenized with the entire charge of extract to be dried as long as the volatile aroma fraction is added after homogenization. Expressed coffee oil is preferred over solvent extracted oil and can be obtained by use of a conventional oil expeller. The oil obtained contains a small portion of fines which may be removed by clarifying the oil. The expeller cake which remains after the oil is expelled is pelletized and then added back at a low level to the roasted and ground coffee which has yet to be dearomatized and extracted.

Among the volatile aromas which can be combined with the homogenized oil prior to drying are roaster gas aroma collected during the roasting of coffee, grinder gas aroma collected at room temperature and under atmospheric conditions during the grinding of freshly roasted coffee, dry vacuum distilled aroma collected by heating a bed of dry roasted coffee under vacuum and condensing the vapors (Lemonnier 2,680,687), wet vacuum distilled aroma collected by heating a bed of moistened roasted coffee under vacuum and condensing the vapors (Mook et al. 3,035,922), and steam distilled aroma collected by contacting a bed of coffee with steam and then condensing the vapors (Nutting 2,562,206, Mahlmann 3,132,947 and Mishkin et al. 3,148,070). These aromas can be used at various levels depending on the particular aroma within a broad range of 1% to 5% by weight of the soluble solids in the dried coffee. For example, dry vacuum aroma is usually used at a level of 1% to 2%, steam distilled aroma at 3% to 5%, and grinder gas at 2% (this aroma is usually collected as a frost which contains about 95% $CO_2$, 4% water and only 1% volatile aromas).

It is a preferred feature of this invention to employ steam distilled aromas at a level of 3% to 5% with the homogenized oil. Most preferably, the steam distilled aroma is that described in the Mahlmann patent 3,132,947.

After the homogenized oil and volatile aromas are added to the extract, the aromatized extract may be dried, either by spray-drying, freeze-drying, or any other known technique. Also, the extract stream may be divided into two portions, one portion aromatized, frozen and then freeze-dried while the remaining dearomatized portion is spray-dried and then combined with the freeze-dried product. In this manner the vapor load on the freeze-drying equipment can be relieved at a small sacrifice in quality. Preferably, between 5% to 50%, say 20%, the extract stream is aromatized and freeze-dried. It is possible to use less extract but then it becomes difficult for the extract to act effectively as a carrier for all the added aroma.

In freeze-drying the aromatized extract, the extract is first frozen to below its eutectic point (−10° to −13.5° F.) and then freeze-dried under a vacuum of less than 500 microns and a product temperature of below 110° F. The frozen product may be freeze-dried in the granulated form or in slab form and the freezing rate can be controlled to extend over 15 minutes if a dark-colored freeze-dried product is desired.

Example I

Two hundred pounds of whole roasted coffee was introduced into a commercial oil expeller and expressed at 10,000 p.s.i.g. in a screw press wherein the screw had flights traveling within a complementary perforated cage or screen concurrent to the feed of coffee. Sixteen pounds of oil was obtained, which was then clarified by passing it through a commercial pressure filter. Twelve pounds of clarified oil and 4 pounds of fines was obtained. The oil expression and clarification was carried out in a carbon dioxide atmosphere to prevent oil degradation. The clarified oil was then stored at 50° F. under carbon dioxide until ready for use.

The expeller cake resulting from the expression of the coffee was then pelletized by extruding it through ⅜″ die holes and cutting it into pellet lengths in the order of ⅜″ to ½″. The pellets were added to 800 lbs. of roasted and ground coffee. The mixture was introduced into a conventional commercial coffee extractor approximately 20″ in diameter and 20′ high. Steam at a pressure of 2–3 p.s.i.g. was introduced into the bottom of the percolator and permitted to pass through the column of coffee to wet the coffee and distill volatile aromatics. The steam was allowed to pass through the column for a period of 25 minutes. The vapors from the top of the column were collected during the last 10 minutes steaming and condensed in a brine condenser at 35° F. under a carbon dioxide atmosphere. Five thousand cc. of the steam distillate was collected. The steam distillate collected in this manner was then held at 35° F. until it was used.

The steamed coffee was extracted with 3000 lbs. of water under conventional coffee percolation techniques used in soluble coffee production. Three hundred pounds of soluble solids was extracted and collected as a liquid extract which weighed 900 lbs. The extract was cooled to 60° F. and 720 lbs. of the extract was then spray-dried by conventional coffee spray drying wherein the extract was sprayed at 200 p.s.i.g. through an atomizing nozzle while air was introduced co-currently with the extract spray at a temperature of 500° F. to obtain a soluble coffee powder having 3% moisture. The remaining 180 lbs. of the extract was divided into two 90 lb. portions. Six pounds of the expressed oil was warmed to 65° F. and dispersed in 90 lbs. of extract by homogenization at 2,000 p.s.i.g. The steam distillate was added to the other 90 lbs. of extract and mixed. The two 90 lbs. batches were then combined and frozen at a thickness of ⅛″ in trays in a period of about one hour to a temperature of −30° F. The mixture of extract and aromas was placed in a commercial freeze drying unit. A vacuum of 100 microns absolute presure was drawn on a freeze dryer and heat gradually applied to permit the temperature within the freeze-dryer and of the product to rise to no more than −10° F. during the first six hours. The temperature was then permitted to rise gradually to 80° F. during the next six hours, while the absolute pressure was permitted to decrease from 150 microns to 15 microns. The freeze dried product removed had 3% moisture. The freeze dried product was combined with the spray dried powder obtained from the 720 lbs. of extract which was obtained by spraying the extract.

The cup flavor of the rehydrated product had desirable strength and body with the flavor notes of regular brewed coffee.

Examples II

Two hundred pounds of whole roasted coffee was introduced into a commercial oil expeller and expressed as in Example I. Sixteen pounds of oil was obtained, which was then clarified by passing it through a commercial pressure filter. Twelve pounds of clarified oil and 4 lbs. of fines were obtained. The oil expression and clarification were carried out in a carbon dioxide atmosphere to prevent oil degradation. The clarified oil was then stored at 50° F. under carbon dioxide until ready for use. The expeller cake resulting from the expression of the coffee was then pelletized and added to 800 lbs. of roasted and ground coffee. The mixture was introduced into the coffee extractor described in Example I. Steam at a pressure of 2–3 p.s.i.g. was introduced into the bottom of the percolator and permitted to pass through the column of coffee to wet the coffee and distill volatile aromatics. The steam was allowed to pass through the column for a period of 25 minutes. The vapors from the top of the column were passed through a fractionator column packed with ½″ glass beads, 6′ tall and 4″ in diameter which was in series in the line between the percolator column and a brine condenser, and condensed in a brine condenser at 35° F. under a carbon dioxide atmosphere. One thousand cc. of the steam distillate was collected. The steam distillate collected in this manner was then held at 35° F. until it was used.

The steamed coffee was then extracted with 3000 lbs. of water under conventional coffee percolation techniques used in soluble coffee production. Three hundred pounds of soluble solids was extracted and collected as a total extract which weighed 900 lbs. The extract was cooled to 60° F. and 720 lbs. of the extract was then spray dried by conventional coffee spray drying wherein the extract was sprayed at 200 p.s.i.g. through an atomizing nozzle while air was introduced co-currently with the extract spray at a temperature of 500° F. to obtain a soluble coffee powder at 3% moisture. The remaining 180 lbs. of the extract was divided into two 90 lb. portions. Six pounds of the expressed oil was warmed to 65° F. and dispersed in 90 lbs. of extract by homogenization at 2,000 p.s.i.g. The fractionated steam distillate was added to the other 90 lbs. of extract and mixed. The two 90 lb. batches were then combined and frozen at a thickness of ⅛″ in trays in a period of about one hour to a temperature of −30° F. The extract-aroma combination was then placed in a commercial freeze drying unit. A vacuum of 100 microns was drawn on the freeze dryer and heat gradually applied to permit the temperature within the freeze dryer and of the product to rise to no more than −10° F.during the first six hours. The temperature was then permitted to rise gradually to 80° F. during the next six hours, while the absolute pressure was permitted to decrease from 150 microns to about 15 microns. The freeze dried product removed had 3% moisture. The freeze dried product was combined with the spray dried powder obtained from the 720 lbs. of extract which was obtained by spraying the extract.

The cup flavor of the rehydrated product had a better balance than the product of Example I and contained in addition to the regular notes typified in Example I, some light winey flavor notes which balanced the heavy notes and resulted in a well-rounded cup flavor, similar to that found in regular coffee.

Example III

The 800 lbs. of roasted and ground coffee plus 200 lbs. of pelletized express cake such as obtained in Example I was treated in the percolator column of Example I by the process described by Lemonnier in U.S. Patent 2,680,687, to obtain 15 liters of dry vacuum distilled aroma, which was then stored in the frozen state until used. The column of coffee was then fractionally steam distilled as in Example II to obtain a 1000 cc. portion of fractionated steam distillate. The condensable vapors passing through the brine condenser during condensation of the steam distillate were trapped and collected in a liquid nitrogen trap, as a second steam distillate fraction, and held in the trap until used. Two thousand grams of the liquid nitrogen condensate was collected. The coffee was then percolated as in Example I to obtain a coffee extract. One hundred eighty pounds of this extract was divided into four equal portions.

The dry vacuum distilled aroma frost was thawed and the liquid added to 45 lbs. of extract and mixed. The steam distillate aroma and coffee oil were each added to a separate 45 lbs. portion of extract and then combined as in Example I. The second steam distillate fraction was held at liquid nitrogen temperature, and added as a frost to the remaining portion of extract in a stainless steel beaker and to the mixture was immediately added 30 lbs. of grinder gas frost previously obtained by collecting grinder gas evolving in the grinding of roasted coffee by condensing such gas in a liquid nitrogen trap, which was then warmed to −78° C. and held at such temperature until used. The two aroma frosts, when added to the extract, released considerable quantities of carbon dioxide which caused foaming of the extract as they thawed.

The four aromatized extract portions were then combined, mixed, frozen and freeze dried as in Example I. The freeze dried product containing 3% moisture was added to the remaining extract which had been spray dried as in Example I.

The flavor of the rehydrated product had an extremely well-balanced cup flavor, containing all of the flavor characteristics of brewed coffee.

Example IV

The 800 lbs. of roasted and ground coffee plus 200 lbs. of pelletized express cake such as obtained in Example I were treated in a percolator column with a process described by Lemonnier in U.S. Patent 2,680,687 to obtain 15 liters of dry vacuum distilled aroma which was then stored in the frozen state until used. The column of coffee was then steam distilled as in Example II to obtain a 1000 cc. portion of fractionated steam distillate. The condensable vapors passing through the brine condenser during condensation of the steam distillate were trapped and collected in a liquid nitrogen trap as a second steam distillate fraction and held in the trap until used. Two thousand grams of the liquid nitrogen condensate frost were collected. The coffee was then percolated as in Example I to obtain a coffee extract. Ninety pounds of this extract was divided into two equal portions.

The dry vacuum distilled aroma frost was thawed and the liquid added to one of the portions of extract and mixed. The second steam distillate fraction was held at liquid nitrogen temperature, and added as a frost to the remaining portion of extract in a stainless steel beaker and to the mixture was immediately added 30 lbs. of grinder gas frost previously obtained by collecting grinder gas evolving in the grinding of roasted coffee by condensing such gas in a liquid nitrogen trap, which was warmed to −78° C. just before being used. The frosts, when added to the extract, released considerable quantities of carbon dioxide which caused foaming of the extract as they thawed. The two aromatized extract portions were then combined, mixed, frozen and freeze dried as in Example I.

The oil and coffee extract were prepared as in Example I and added to the 810 lbs. of extract which was to be spray dried. To the 810 lbs. of extract containing the dispersed oil was added the fractionated steam distillate obtained in Example I, and the extract containing the dispersed oil and steam distillate was then spray dried, as in Example I. To the spray dried extract was then added the dry vacuum distilled aroma and the second distillate fraction of the steam aroma which had been freeze dried after the two portions were mixed.

The cup flavor of the product had a high level of the flavor qualities of regular brewed coffee although not as well balanced as in the previous three examples.

Example V

Twenty pounds of whole roasted coffee was introduced into a commercial oil expeller and 1.6 lbs. of oil was obtained. The oil was clarified by passing it through a commercial pressure filter and 1.2 lbs. of clarified oil and 0.4 lb. of fines were obtained. The oil expression and the clarification was carried out in a carbon dioxide atmosphere to prevent oil degradation. The clarified oil was stored at 50° F. under a carbon dioxide atmosphere until ready to use. The expeller cake was then pelletized and added to 80 lbs. of roasted and ground coffee. The mixture was introduced into a conventional coffee percolator. Steam at a pressure of 2–3 p.s.i.g. was introduced into the bottom of the percolator and permitted to pass through the column of coffee to wet the coffee and distill the volatile aromatics. The steam was passed through the column for 25–30 minutes. The vapors were collected from the top of the column during the last 5–10 minutes of steaming by condensing them in a brine condenser at 35° F. under a carbon dioxide atmosphere. Five hundred cubic centimeters of the steam distillate was collected. The steam distillate in condensate form was then held at 35° F. until it was used.

The steamed coffee was extracted with 300 lbs. of water under conventional coffee percolation techniques used in soluble coffee production. Ninety pounds of extract containing 30 lbs. of soluble solids was extracted. The extract was cooled to 60° F. and 72 lbs. of extract was set aside. The remaining 18 lbs. of extract was divided into two 9-lb. portions. Six-tenths of a pound of the expressed oil was warmed to 65° F. and dispersed in 9 lbs. of extract by homogenizing a mixture of oil and extract at 2000 p.s.i.g. The steam distillate was added to the other 9 lbs. of extract. The two portions of extract were mixed and then blended with the remaining 72 lbs. of extract. The total extract containing the steam distilled aroma and dispersed coffee oil was then spray-dried as in Example I.

This product was free-flowing, stable, and had a uniform distribution of oil and aroma through out the dried coffee particles. The flow of the reconstituted product was well balanced but not of the same impact as the Example I product.

Example VI

The procedure of Example V was followed with the exception that the aromatized extract was frozen in stainless steel trays at a thickness of ⅛″ to a temperature of below −30° F. The trays were then placed in a freeze-dryer equipped with internal condensers similar to that described in U.S. Patent 3,132,930 to J. A. Abbott et al., and dried at a vacuum of less than 500 microns and a product temperature of less than 110° F. over a period of at least 13 hours until the moisture of the coffee was reduced to below 3%. Condenser temperature during drying was between −30° F. to −60° F.

The cup flavor of this product on reconstitution had a desirable strength and body which was closer to a freshly prepared brew of coffee than the Example I product.

While this invention has been described by reference to specific examples, reference should be made to its claims for a proper definition of its scope.

What is claimed is:

1. A process for preparing an aromatized soluble coffee which comprises removing coffee oil and volatile aromas from freshly roasted coffee, extracting the dearomatized coffee to obtain an aqueous extract of coffee solids, mixing said coffee oil with said extract, homogenizing said mixture of oil and extract at a pressure of at least 1000 p.s.i.g., adding said volatile aromas to said homogenized extract, and drying the aromatized extract.

2. The process of claim 1 wherein the coffee oil is expressed coffee oil at a level of 0.2 to 2% by weight of soluble solids in the total extract and the volatile aromas are steam distilled aromas present at a level of 3 to 5% by weight of the soluble solids in the total extract.

3. The process of claim 2 wherein the extract is spray-dried.

4. The process of claim 2 wherein the extract is freeze-dried.

5. The process of claim 2 wherein a minor portion of the dearomatized extract is aromatized and freeze-dried and the major portion of dearomatized extract is spray-dried.

6. The process of claim 5 wherein the spray-dried coffee is about 80% by weight of said soluble coffee.

7. A process for preparing an aromatized freeze-dried coffee which comprises removing coffee oil and volatile steam distilled aroma from freshly roasted coffee, extracting the dearomatized coffee to obtain an aqueous extract of coffee solids, mixing 0.2 to 2% coffee oil by weight of soluble solids in the extract with said extract, homogenizing said mixture of oil and extract at a pressure of between 1000 and 3000 p.s.i.g., adding 3 to 5% steam distilled aroma by weight of soluble solids in the extract with said homogenized extracts freezing said extract to below its eutectic point, and freeze-drying the frozen extract to obtain a soluble coffee of improved aroma and taste.

8. A process for preparing an aromatized free-dried coffee which comprises removing coffee oil and volatile steam distilled aroma from freshly roasted coffee, extracting the dearomatized coffee to obtain an aqueous extract of coffee solids, mixing 0.5 to 1% coffee oil by weight of soluble solids in the total coffee extract with less than 20% of said coffee extract, homogenizing said mixture of oil and coffee extract at a pressure of between 1000 and 3000 p.s.i.g., adding 3 to 5% steam distilled aroma by weight of soluble solids in the total coffee extract to above 80% of said extract, combining the less than 20% portion and the above 80% portion of extract, freezing said extract to below its eutectic point over a period of at least 15 minutes, and freeze-drying the frozen extract to obtain a soluble coffee of improved aroma and taste.

9. A process for preparing an aromatized soluble coffee powder which comprises removing coffee oil and volatile steam distilled aroma from freshly roasted coffee, extracting the dearomatized coffee to obtain an aqueous extract of coffee solids, mixing 0.5 to 1% coffee oil by weight of soluble solids in the total coffee extract with less than 20% of said coffee extract, homogenizing said mixture of oil and coffee extract at a pressure of between 1000 and 3000 p.s.i.g., adding 3 to 5% steam distilled aroma by weight of soluble solids in the total coffee extract to above 80% of said extract, combining the less than 20% portion and the above 80% portion of extract, and spray-drying the aromatized extract to obtain a soluble coffee powder.

References Cited by the Examiner

UNITED STATES PATENTS

| | | | |
|---|---|---|---|
| 2,292,447 | 8/1942 | Irwin. | |
| 2,557,294 | 6/1951 | Kellogg | 99—71 |
| 2,562,206 | 7/1951 | Nutting | 99—71 |
| 2,563,233 | 8/1951 | Gilmont | 99—71 |
| 2,680,687 | 6/1954 | Semonnier | 99—71 |
| 2,947,634 | 8/1960 | Fildman et al. | 99—71 |
| 3,035,922 | 5/1962 | Mook et al. | 99—71 |
| 3,132,947 | 5/1964 | Mahlmann | 99—71 |
| 3,148,070 | 9/1964 | Mishkin et al. | 99—71 |

OTHER REFERENCES

Siveyz, M., "Food Engineering," May 1959, pp. 92, 93.

A. LOUIS MONACELL, *Primary Examiner.*

M. W. GREENSTEIN, *Assistant Examiner.*